United States Patent

[11] 3,609,042

[72] Inventors Kazuo Yasuda;
Koichi Uchino; Hiroshi Inomata, all of Katsuta-shi, Japan
[21] Appl. No. 823,336
[22] Filed May 9, 1969
[45] Patented Sept. 28, 1971
[73] Assignee Hitachi, Ltd.
Tokyo, Japan
[32] Priority May 13, 1968
[33] Japan
[31] 43/31647

[54] OPTICAL MEASURING APPARATUS FOR SAMPLING MATERIAL, MAKING A FLAME TEST, AND COMPARING THE LIGHT FROM AN UNKNOWN CONCENTRATION WITH THAT FROM TWO KNOWN CONCENTRATIONS
10 Claims, 5 Drawing Figs.

[52] U.S. Cl........................................................ 356/87,
250/214 R, 250/217 R, 250/218, 356/187
[51] Int. Cl. ...................................................... G01j 3/30,
G01j 3/48, H01j 39/12

[50] Field of Search............................................ 356/85, 87,
187; 250/214, 218, 217

[56] References Cited
UNITED STATES PATENTS
2,885,926  5/1959  Molloy ......................... 356/187

Primary Examiner—James W. Lawrence
Assistant Examiner—T. N. Grigsby
Attorney—Craig, Antonelli and Hill ABSTRACT: Optical measuring apparatus for sampling material in which a first and a second samples of known concentration and a third sample of which concentration is unknown but in between those of the first and the second samples are intermittently introduced in this order into a flame, light beams which pass through the flame being detected by a detector which in turn produces a first, a second and a third electric signals corresponding to the concentrations of the first, second and third samples, the third electric signal being compared with the first and the second signals and thereafter introduced into an indicating means.

INVENTORS
KAZUO YASUDA, KOICHI UCHINO
and HIROSHI INOMATA

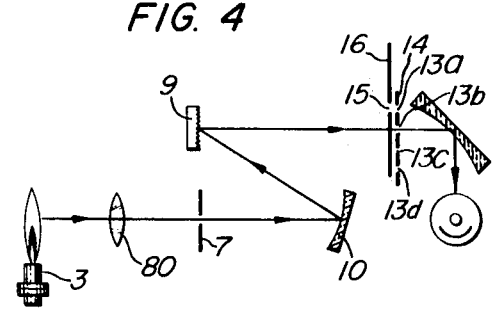
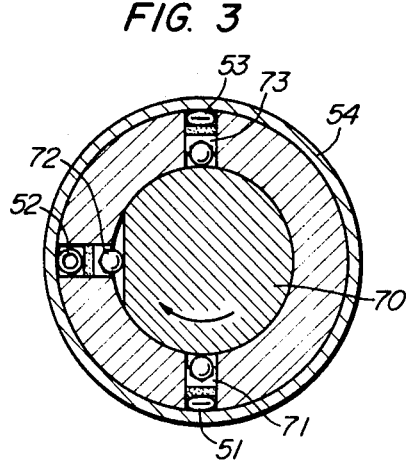
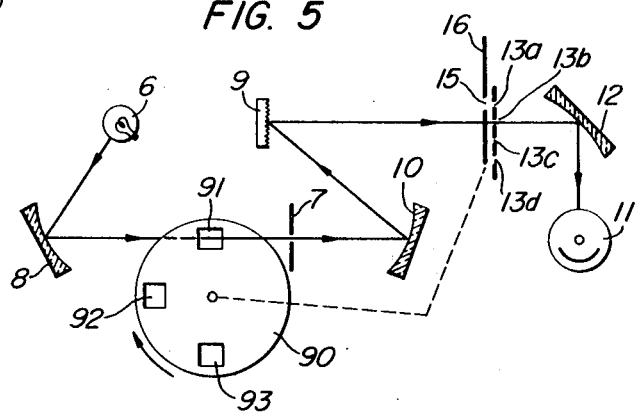
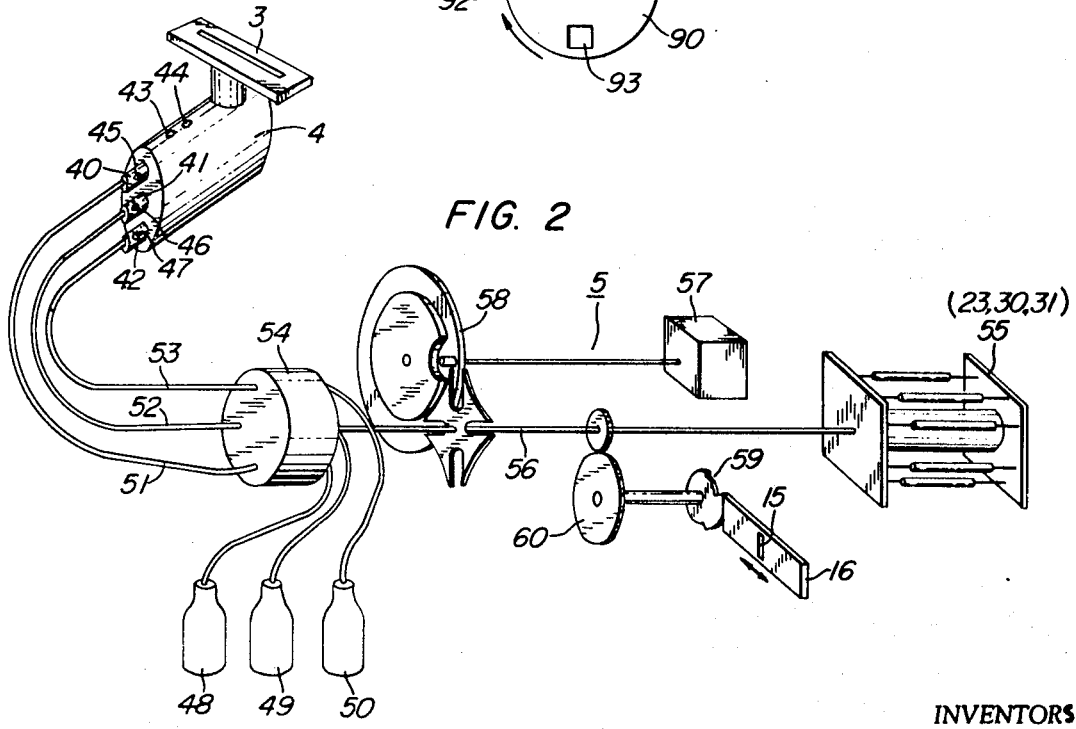

3,609,042

OPTICAL MEASURING APPARATUS FOR SAMPLING MATERIAL, MAKING A FLAME TEST, AND COMPARING THE LIGHT FROM AN UNKNOWN CONCENTRATION WITH THAT FROM TWO KNOWN CONCENTRATIONS

BACKGROUND OF THE INVENTION

1. Field of the Invention

The present invention relates to an optical measuring apparatus for sampling material and more particularly to such an apparatus that can exactly determine the concentration of a sample when the concentration of the sample is not exactly known but it is known that the concentration is between those of two other samples of known concentration.

2. Description of the Prior Art

As an example of samples having concentrations which are close together, electrolytes in blood sera which are used in clinical laboratories are known. When optically measuring the concentration of such a sample, if there is any apparatus that can automatically determine the upper and lower limits of measurement by using samples having known concentrations which are slightly higher and lower than that of the unknown sample to be tested and thereafter automatically perform the measurement of the unknown sample, the apparatus would be of importance in that it can measure the concentration of the unknown sample to be tested with high accuracy and efficiency.

SUMMARY OF THE INVENTION

It is therefore an object of the present invention to provide an optical measuring apparatus for sampling material which can measure accurately and efficiently the concentration of an unknown sample of which concentration is within the range of those of known two samples.

Another object of the present invention is to provide an optical measuring apparatus for sampling material which can measure accurately and efficiently the concentration of an unknown sample of which concentration is between those of two known samples, without including in the measured result any error due to the change of the light source or that of the sensitivity of a detector.

According to the present invention, there is provided an optical measuring apparatus for sampling material which comprises means for obtaining a first, a second and a third electric signal, respectively, corresponding to the concentrations of a first and a second known sample of different concentration and a third unknown sample having a concentration between those of said first and second samples, means for comparing said third electric signal with said first and second electric signals, and means for taking out said compared third electric signal.

The other objects and the features of the present invention will become apparent from the descriptions which follows taking reference to the accompanying drawings.

BRIEF DESCRIPTION OF THE DRAWINGS

FIG. 2 is a perspective view of a programming system which is suitable for use with the apparatus shown in FIG. 1;

FIG. 3 is a sectional view of a selector valve used in the system shown in FIG. 2;

FIG. 4 shows an optical system of a flame analysis type optical sample testing apparatus made in accordance with another embodiment of the present invention; and, FIG. 5 shows an optical system of a photocell-type optical measuring apparatus for sampling material made in accordance with a further embodiment of the present invention.

DESCRIPTION OF THE PREFERRED EMBODIMENTS

Figure 1:
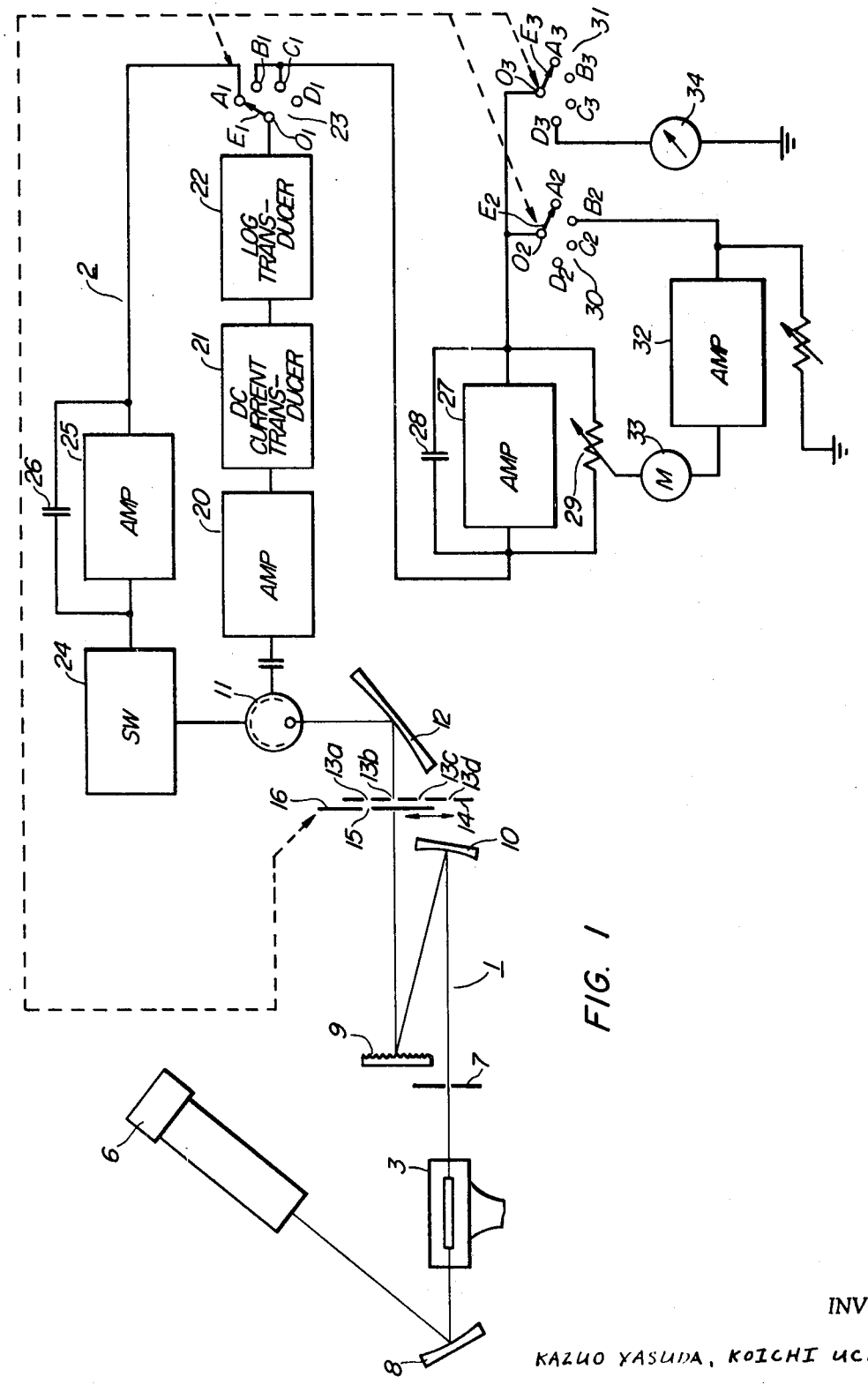
FIG. 1 is a schematic diagram showing the principle of an atomic absorption-type optical measuring apparatus for sampling material in accordance with an embodiment of the present invention.

Referring to FIGS. 1 through 3 of the drawings, there is shown an atomic absorption type optical measuring apparatus for sampling material. The apparatus comprises an optical system 1, a detecting circuit system 2, a burner portion 3 which provides a flame, a sample atomizing chamber 4 and a programming system 5. The optical system 1 includes a light source 6, a slit 7, a condenser mirror 8 for collecting the light beam from the light source 6 through the flame formed by the burner portion 3 into the slit 7, a monochromator 9, a collimating mirror 10 for directing the light beam from the slit 7 to the monochromator 9, a detector 11, a condenser mirror 12 for collecting the light dispersed by the monochromator 9 onto the detector 11, a slit plate 14 disposed between the monochromator 9 and the condenser mirror 12 and having four slits 13$a$, 13$b$, 13$c$ and 13$d$, and a mask 16 which is movable in the direction shown by an arrow in front of the slit plate 14 and provided with a slit 15. As the light source 6, an alternate current hollow cathode lamp may be used. As the monochromator 9, a prism may be used, however, in the illustrated arrangement, a diffraction grating is used. The detector 11 may take various forms, and it would be preferable to use a secondary electron multiplier tube. The slits 13$a$, 13$b$, 13$c$ and 13$d$ of the slit plate 14 are provided for allowing the light flux dispersed by the monochromator 9 to pass through. The mask 16 is provided for selectively aligning its slit 15 with either one of the slits 13$a$, 13$b$, 13$c$ and 13$d$ of the slit plate 14. The number of the slit plate 14 may be varied as desired. The detecting circuit system includes an amplifier 20, a direct current transducer 21, a logarithmic transducer 22, and a selector switch 23 which are connected with the detector 11 in this order. The selector switch 23 comprises a common contact $O_1$, selector contacts $A_1$, $B_1$, $C_1$ and $D_1$ and a switch arm $E_1$ for selectively connecting either one of the selector contacts $A_1$, $B_1$, $C_1$ or $D_1$ with the common contact $O_1$. The common contact $O_1$ of the selector switch is connected with the output side of the logarithmic transducer 22. Further, the detecting circuit system 2 includes an electric power supply and control means 24 for the detector 11, an amplifier 25 connected between the means 24 and the contact $A_1$ of the selector switch 23, and a holding condenser 26 connected between the input and output sides of the amplifier 25. The detecting circuit system 2 also includes an amplifier 27, a holding condenser 28 and a variable resistor 29 which are connected parallel between the input and output sides of the amplifier 27, selector switches 30 and 31, an amplifier 32, a balance motor 33, and an indicating means 34. The contacts $B_1$ and $C_1$ of the selector switch 23 are connected with each other and also with the input sides of the amplifier 27. The selector switches 30 and 31 respectively includes common contacts $O_2$ and $O_3$, selector contacts $A_2$ and $A_3$; $B_2$ and $B_3$; $C_2$ and $C_3$; and $D_2$ and $D_3$; and switch arms $E_2$ and $E_3$ for selectively connecting the selector contacts $A_2$ and $A_3$; $B_2$ and $B_3$; $C_2$ and $C_3$; and $D_2$ and $D_3$ with the common contacts $O_2$ and $O_3$ respectively. The output side of the amplifier 27 is connected with the common contacts $O_2$ and $O_3$ of the selector switches 30 and 31. The amplifier 32 is connected at its input side with the selector contact $B_2$ of the selector switch 30 and at its output side with the balance motor 33 which is arranged so as to adjust the variable resistor 29. The indicating means 34 is connected with the selector contact $O_3$ of the selector switch 31. As will be described later, the selector switches 23, 30 and 31 are operated in synchronism with the movement of the mask 16. The atomizing chamber 4 is disposed below the burner portion 3 and has three sample atomizers 40, 41 and 42, an inlet port 43 for a fuel such as acetylene gas, and an air inlet port 44. The sample atomizers 40, 41 and 42 are provided with air feed ports 45, 46 and 47. Three sample containers 48, 49 and 50 are provided for containing the samples, and they are respectively connected with the sample atomizers 40, 41 and 42 by means of flexible pipes 51, 52 and 53 respectively. A selector valve 54 is provided for selectively opening either one of the pipes 51, 52 and 53.

The programming system 5 comprises a rotatable shaft 56 connected with the selector valve 54 and a selector switch means 55, a motor 57, and an intermittent drive mechanism 58 of known construction for rotatably driving the shaft 56 by a quarter of one turn in response to one full turn of the motor 57. The selector switch means 55 includes the selector switches 23, 30 and 31 shown in FIG. 1. The programming system 5 further includes a cam 59 for displacing the mask 16 in the direction shown by an arrow, and a gear mechanism 60 disposed between the cam and the rotatable shaft 56 for driving the cam. The cam 59 is so shaped that the slit 15 of the mask 16 is put into alignment with either one of the slits 13a, 13b, 13c, or 13d of the slip plate 14 with every quarter turn of the cam 59. The gear mechanism 60 is so designed that the speed ratio of the cam 59 to the rotational shaft 56 is 1:16. The selector valve 54 comprises a rotor 70 directly connected with the rotatable shaft 56, and depressing elements 72, 73 and 74, for depressing and closing either two of the pipes 51, 52 and 53 leaving the remaining one open in response to the rotation of the rotor.

The operation of the apparatus shown in FIGS. 1, 2 and 3 will not be described. When the motor 57 is started, the rotatable shaft 56 is intermittently driven by means of the drive mechanism 58. More precisely, the rotatable shaft 56 is rotated by a quarter turn in response to every field turn of the motor 57 by the intermittent drive mechanism 58. The rotor 70 is similarly driven by the rotatable shaft 56 so that only one of the pipes 51, 52 and 53 is selectively opened. The rotor 70 is similarly driven by the fuel and air is continuously introduced through the fuel inlet port 43 and the air inlet port 44 into the atomizing chamber 4, and an additional amount of air is also introduced as desired through the air feed ports 45, 46 and 47. The mixture of fuel and air is thus injected into the upper part of the burner portion 3 and ignited to form a flame. For the purpose of description, it is assumed that the sample container 48 is filled with a known sample of lower concentration, the sample container 49 with a known sample of higher concentration, and the sample container 50 with an unknown sample having a concentration between those of said two known samples. When the pipe 51 is opened by the action of the selector valve 54, the sample of lower concentration within the sample container 48 is introduced into the atomizer 40 under the influence of the air passing through the air inlet port 45 of the sample atomizer 40. The introduced sample is then injected from the atomizer 40 into the atomizing chamber 4. In practice, the atomizing chamber 4 is so constructed that it in heated to a desired temperature, whereby the atomizing of the known lower concentration sample injected thereinto will be facilitated. The atomized known sample of lower concentration is then introduced into the flame in the burner portion 3. When the pipes 52 and 53 are opened, the known sample of higher concentration and the unknown sample are atomized and introduced into the flame quite similar manner when the known sample of lower concentration is introduced. When the rotatable shaft 56 is intermittently driven by the motor 57 and the drive mechanism 58, the rotor 70 is intermittently driven together with the selector switch means 55. Thus, the pipes 51, 52 and 53 are opened one after another in this order, in synchronism therewith, the selector contacts $A_1$, $A_2$ and $A_3$; $B_1$, $B_2$ and $B_3$; and $C_1$, common contacts $O_1$, $O_2$ and $O_3$ respectively. Thus 2 and $C_3$ of the selector switches 23, 30 and 31 are sequentially brought into operational connection with the common contacts $O_1$, $O_2$ and $O_3$ and the selector contacts $D_1$, $D_2$ and $D_3$ of the switches are thereafter brought into connection with the common contacts $O_1$, $O_2$ and $O_3$ respectively. Thus one operational cycle is completed. During this operational cycle, the slit 15 of the mask 16 is aligned with the slit 13a of the slit plate 14. After this first cycle is completed and the second operational cycle, the slit 15 is brought into alignment with the slit 13b. Similarly, during further third and fourth operational cycles, the slit 15 is brought into alignment with the slits 13c and 13d respectively. When all of the cycles are completed, the slit 15 is again aligned with the slit 13a.

The method for measuring the concentration of unknown sample will now be described referring to FIG. 1. The light beam from the light source 6 is projected through the condenser mirror 8 into the flame formed by the burner portion 3. The light beam which has passed through the flame is directed through the slit 7 and projected by the collimating mirror onto the monochromator where the beam is dispersed in accordance with its wave length. When the slit 15 is in alignment with the slit 13a, the light beam of a particular wave length is allowed to pass through the aligned slits and the condenser mirror 12 to the detector 11 to be detected thereby. When the known sample of lower concentration is initially introduced into the flame, an output can be obtained from the detector 11 in accordance with the concentration of the sample. In this instance, the slit 15 is in alignment with the slit 13a as described above, and the selector contacts $A_1$, $A_2$ and $A_3$ of the switches 23, 30 and 31 are connected with the common contacts $O_1$, $O_2$ and $O_3$ respectively. The output of the detector is transmitted through the amplifier 20 and the direct current transducer 21 into the logarithmic transducer 22 where a logarithmic transformation is effected so as to convert a transparency into a extinction rate of the known sample of lower concentration. The output to which a logarithmic transformation is effected is then amplified by the amplifier 25 and transferred to the electric power supply and the control circuit 24 of the detector 11, where the electric supply is controlled so that the output of the detector becomes substantially constant. The output of the detector is maintained substantially constant by the holding condenser 26 throughout the operation in which the selector contacts $B_1$, $B_2$ and $B_3$, and $C_1$, $C_2$ and $C_3$ of the switches 23, 30 and 31 are sequentially connected one after another with the common contacts $O_1$, $O_2$ and $O_3$. The above in the operation for determining the lower limit level of the measurement.

After the above operation, the known sample of higher concentration is introduced into the flame, an output is obtained from the detector 11 in accordance with the concentration of the sample. Of course, the slits 15 and 13a are aligned together in this instance, however, the selector contacts $B_1$, $B_2$ and $B_3$ of the switches 23, 30 and 31 are respectively connected with the common contacts $O_1$, $O_2$ and $O_3$. Thus, the detector output is amplified by he amplifiers 27 and 32 and introduced into the balance motor 33. The gain of the amplifier 27 is so adjusted by the motor 33 that the output thereof is at a predetermined value. The value maintained throughout the operation in which the selector contacts. $C_1$, $C_2$ and $C_3$ of the switches 23, 30 and 31, are connected with the common contacts $O_1$, $O_2$ and $O_3$ respectively. The above is the operation for determining the upper limit level of measurement.

After the above operation, an unknown sample having a concentration between those of said two known samples is introduced into the flame, an output corresponding to the concentration of the unknown sample is obtained at the detector 11. Of course, the slits 15 and 13a are in alignment with each other in this instance, however, in the switches 23, 30 and 31, the selector contacts $C_1$, $C_2$ and $C_3$ are placed in contact with the common contacts $O_1$, $O_2$ and $O_3$ respectively. Therefore, the output of the detector 11 is charged in the condenser 28.

Finally, when the selector contacts $D_1$, $D_2$ and $D_3$ of the switches 23, 20 and 31 are brought into contact with the common contacts $O_1$, $O_2$ and $O_3$, the output of the detector which has been charged in the condenser 28 is discharged and directed toward the indicating means where it is read.

Thus, the whole cycle of sample introduction and switch actuation is completed and a cycle of measurement is performed. Thereafter, the slits 15 and 13b are brought into alignment with each other and a next cycle of measurement is performed. Similarly, further cycles of measurement are performed by putting the slits 13c and 13d into alignment with the slit 15. Of course, in each cycle, a measurement is performed in quite similar manner as in the first cycle.

From the above description, it will be apparent that, according to the above-described embodiment of the present invention, the upper and the lower limits of measurement are automatically determined by using a known sample of a lower concentration and another known sample of a higher concentration, thereafter an unknown sample having a concentration between those of said known samples is automatically measured. This means that the detector output representing the concentration of the unknown sample is automatically compared with those representing the concentration of the known samples. Thus, the concentration of the unknown sample is measured by differences from those of the two known samples, so that even when the concentrations of the two known samples are close together, the concentration of the unknown sample can be measured exactly and efficiently.

The intensity of light source, the flame or the sensitivity of the detector are apt to vary. However, according to the above-described embodiment of the present invention, the upper and lower limit levels of the measurement are not only determined by the two known but they are maintained when the unknown sample is measured. Therefore, when the frequency of the variation is lower than the interval of the sample introduction and the actuation of the selector switches, the error on the measurement caused by the variation can be practically ignored.

According to the experiments made by the inventors, it has been found that when each of the samples were injected into the atomizing chamber 4 through a common passage, each of the samples was contaminated by the others in said passage resulting in an error of a measured result. However, when separate passages are provided one for each sample to direct it into the atomizing chamber 4, as shown in FIG. 2, the above-described problem was not encountered.

FIG. 4 shows an optical system of a flame analysis type optical measuring apparatus for sampling materials made in accordance with the present invention. In FIG. 4, the parts corresponding to those in FIG. 1 are designated by the same reference numerals. The optical system shown in FIG. 4 is different from that in FIG. 1 in that the former is intended to measure the luminosity of the flame formed by the burner portion 3. Therefore, the optical system of FIG. 4 does not require any light source and condenser mirror such as those 6 and 8 shown in FIG. 1. In the optical system of FIG. 4, in order to condense the light flux from the flame formed by the burner portion 3 into the slit 7, there is provided a condenser lens 80 which is equivalent to the condenser mirror 8 shown in FIG. 1. In the optical system of FIG. 4, although the shape of the flame formed by the burner portion is somewhat different from that in FIG. 1, the programming system and the selector valve shown in FIGS. 2 and 3 respectively and the detector circuit system shown in FIG. 1 can be used in combination with the system of FIG. 4. Therefore, it is apparent that the optical system of the flame analysis type apparatus can perform similar measurement as in the absorption type optical system.

FIG. 5 shows an optical system for a photocell type optical measuring apparatus for sampling material. In this figure, the parts corresponding to those in FIG. 1 are designated by the same reference numerals. This system differs from that in FIG. 1 in that the former is provided with sample cells in lieu of the flame. Thus, in FIG. 5, three sample cells 91, 92 and 93 are mounted on a rotatable disc 90 at the periphery thereof. The sample cells 91, 92 and 93 are respectively filled with a known sample of a lower concentration, a known sample of a higher concentration and an unknown sample having a concentration between those of said two known samples. In FIG. 1, the introduction of the samples is controlled in synchronism with the movement of the mask 16. Similarly, in this system, the rotatable disc 90 is intermittently rotated in synchronism with the movement of the mask 16. Since the intermittent drive mechanism can take any conventionally known form, the detail thereof is not shown in the drawing. The optical system of FIG. 5 can also be used with the detector circuit of FIG. 1, so that it is apparent that it can perform a similar function as the system shown in FIG. 1.

Since various embodiments which seem at a glance to be very different from each other are possible without departing from the scope of the present invention, all the matters described previously and illustrated in the drawings should be understood to be set forth by way of example and have no limitative sense.

We claim:

1. An optical measuring apparatus for sampling material comprising means for automatically guiding a first and second known sample of different concentration and a third sample having an unknown concentration between those of said first and second samples sequentially in a predetermined order to a predetermined position, means for producing in said predetermined position first, second and third light beams having intensities corresponding to concentrations of said first, second and third samples, respectively, according to said predetermined order, means for converting said first, second and third light beams into first, second and third electric signals, respectively, means for amplifying said first, second and third electric signals, means for adjusting and maintaining said converting means at a sensitivity where said first electric signal has a first predetermined value, means for adjusting and maintaining said amplifying means at an amplification factor where said second electric signal has a second predetermined value, means for taking out said third electric signal while said converting and amplifying means are maintained at said sensitivity and said amplification factor, respectively, and means for automatically controlling said predetermined order.

2. An optical measuring apparatus for sampling material comprising means for forming a flame, means for introducing into said flame a first sample, a second sample having a concentration different from that of said first sample and a third sample having a concentration between those of said first and second samples sequentially in a predetermined order, means for producing in said flame first, second and third light beams having intensities corresponding to the concentration of said first, second and third samples, respectively, in said predetermined order, means for converting said first, second and third light means into first, second and third electric signals, respectively, means for amplifying said first, second and third electric signals, means for adjusting and maintaining said converting means at a sensitivity where said first electric signal has a first predetermined value, means for adjusting and maintaining said amplifying means at an amplification factor where said second electric signal has a second predetermined value, means for taking out said third electric signal while said converting and amplifying means maintains said sensitivity and said amplification factor, respectively, and means for automatically controlling said predetermined order.

3. An apparatus in accordance with claim 2, in which said means for introducing said first, second and third samples, respectively, includes first, second and third sample atomizers and means for sequentially injecting said first, second and third samples, respectively through said first, second and third atomizers into said flame.

4. An apparatus in accordance with claim 3, in which said means for injecting said first, second and third samples, respectively, includes first, second and third sample containers for containing said first, second and third samples, respectively, first, second and third flexible pipes for communicating said sample containers with said first, second and third sample atomizers respectively, and means for sequentially opening first, second and third pipes one after another in order so that the first, second and third samples contained in said first, second and third sample containers are sequentially introduced in this order through said first, second and third pipes into said first, second and third atomizers respectively.

5. An optical measuring apparatus for sampling material comprising means for forming a flame, means for sequentially introducing into said flame a first known sample, a second known sample having a concentration different from that of said first known sample and a third unknown sample having a concentration between those of said two samples, photoelectric means for detecting the concentrations of said samples as variations in light intensity and converting them into a first, a second and a third electric signal, means for adjusting the sensitivity of said photoelectric means to a first predetermined value in accordance with said first electric signal, means for maintaining said adjusted sensitivity of the first predetermined value throughout the period when the concentrations of said second and third samples are detected, an amplifier which amplify said second and third electric signals from said photoelectric means, means for directing the second electric signal into said amplifier when the sensitivity of said photoelectric means is maintained at said first predetermined value, means for adjusting the amplification of said amplifier to a second predetermined value in accordance with said second electric signal, means for maintaining the adjusted amplification of said second predetermined value throughout the period when the concentration of said third sample is detected, and means for taking out said third electric signal from said photoelectric means through said amplifier when said sensitivity and said amplification are maintained at said first and second predetermined value respectively.

6. An apparatus in accordance with claim 5, said apparatus further comprises selector switch means, said means being adapted to interrupt the electric connection between said photoelectric means and said amplifier when the concentration of said first sample is detected and complete said electric connection when the concentrations of said second and third samples are detected.

7. An apparatus in accordance with claim 6, in which said means for introducing the samples includes a first, a second and a third sample atomizer and means for sequentially injecting said first, second and third samples respectively through said first, second and third atomizers into said flame.

8. An apparatus in accordance with claim 7, in which said means for injecting the samples includes a first, a second and a third sample containers for containing said first, second and third samples respectively, a first, a second and a third flexible pipe for communicating said sample containers with said first, second and third sample atomizers respectively, and means for sequentially opening said first, second and third pipes one after another in this order so that the first, second and third samples contained in said first, second and third sample containers are sequentially introduced in this order through said first, second and third pipes into said first, second and third atomizers respectively.

9. An apparatus in accordance with claim 5, said apparatus further comprises means for projecting a light flux toward said flame and means for sequentially obtaining monochromic lights from the light flux which has passed through said flame during each cycle comprising steps of introducing the first, second and third samples, the monochromic light thus obtained being detected by said photoelectric means.

10. An apparatus in accordance with claim 9 in which the concentration of said first sample is smaller than that of said second sample.